(No Model.) 3 Sheets—Sheet 1.

T. R. JOHNSTON.
GLOBE.

No. 465,274. Patented Dec. 15, 1891.

Attest
S. H. Knight
E. Arthur

Inventor
Thomas Ruddiman Johnston
By Knight Bros.
Attys (No Model.) 3 Sheets—Sheet 2.

T. R. JOHNSTON.
GLOBE.

No. 465,274. Patented Dec. 15, 1891.

(No Model.) 3 Sheets—Sheet 3.

T. R. JOHNSTON.
GLOBE.

No. 465,274. Patented Dec. 15, 1891.

Attest:
Harry S. Rohrer
Walter Allen

Inventor.
Thomas Ruddiman Johnston
By Knight Bros.
Attys.

UNITED STATES PATENT OFFICE.

THOMAS RUDDIMAN JOHNSTON, OF LONDON, NGLAND.

GLOBE.

SPECIFICATION forming part of Letters Patent No. 465,274, dated December 15, 1891.

Application filed March 5, 1890. Serial No. 342,761. (No model.) Patented in England April 11, 1889, No. 6,212.

*To all whom it may concern:*

Be it known that I, THOMAS RUDDIMAN JOHNSTON, map publisher, a subject of the Queen of Great Britain, residing at 26 Charterhouse Square, London, in the county of Middlesex, England, have invented certain new and useful Improvements in Educational Globes, (patented in England April 11, 1889, No. 6,212;) and I do hereby declare that the following is a full, clear, and exact description of the invention, which will enable others skilled in the art to which it appertains to make and use the same.

My invention is embodied in English Patent No. 6,212, dated April, 11, 1889.

My invention has a rubber ball for an interior. I use very thin rubber—in fact, a ball similar to a child's rubber balloon. I also print the globe on thin paper, and having damped and stretched thin muslin over the surface of a section of a rigid and perfect sphere I cut out the paper globe-gores, damp them, and then accurately paste them on this muslin surface. The muslin with its adherent gores is then removed from the section of the sphere, trimmed and joined to the next lot of gores, and so on until the globe is completed, a portion representing the south-polar regions, filling up the space otherwise appearing there. These globes can be folded up, and when required for use assume a truly globular form when the rubber ball is inserted at their northern aperture and afterward inflated.

My improvement consists in a novel manufacture of educational globes, and also in the article necessarily resulting from such manufacture, as hereinafter described and claimed.

In order that my said invention may be more clearly understood and readily carried into effect, I will proceed, aided by the accompanying drawings, more fully to describe the same, in which—

Figure 1:
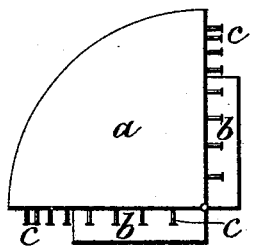
Figure 2:
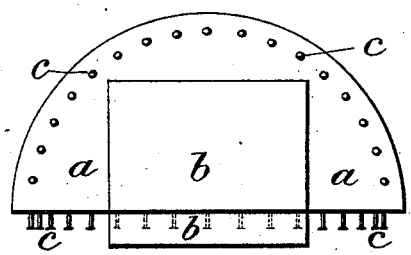
Figure 3:
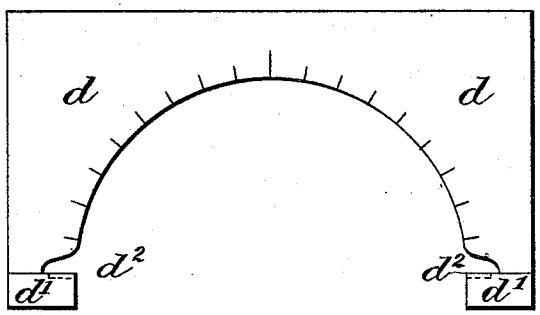
Figure 4:
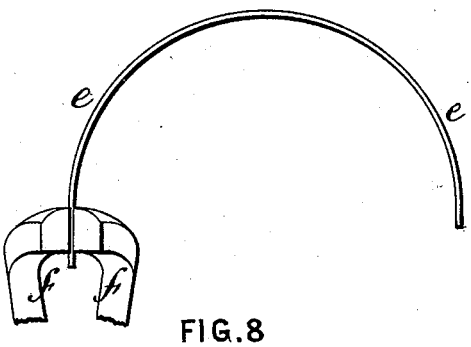
Figure 5:
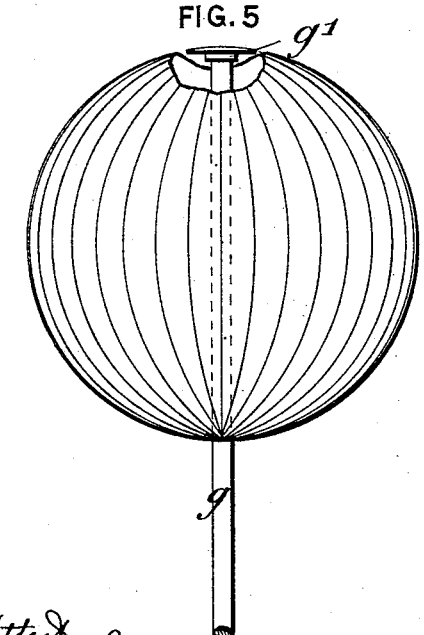
Figure 8:
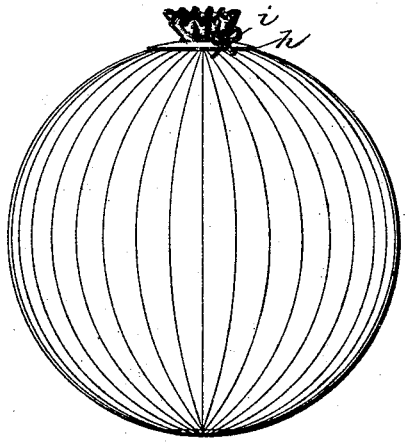
Figure 6:
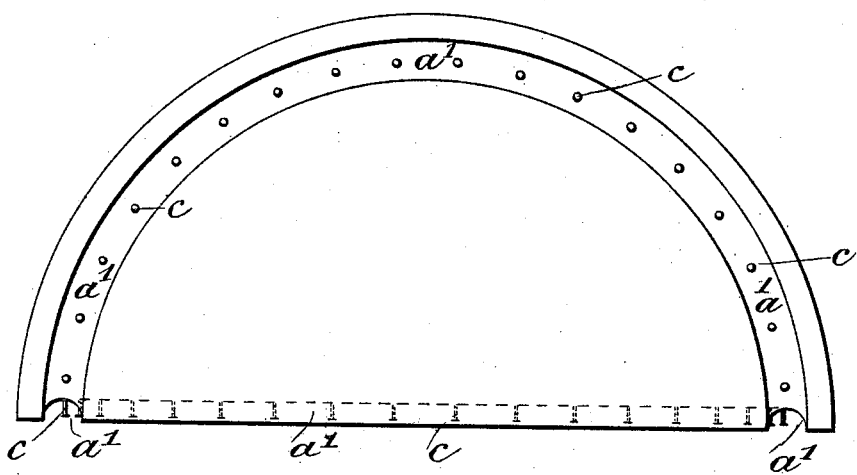
Figure 7:
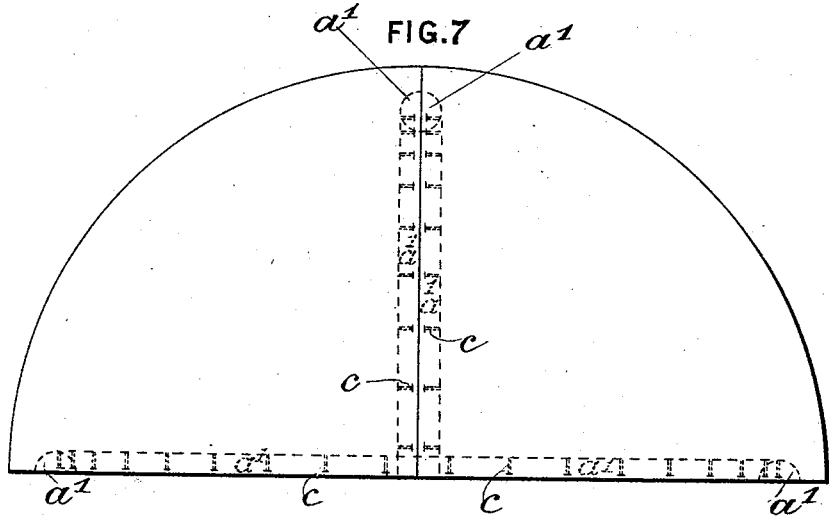
Figure 9:
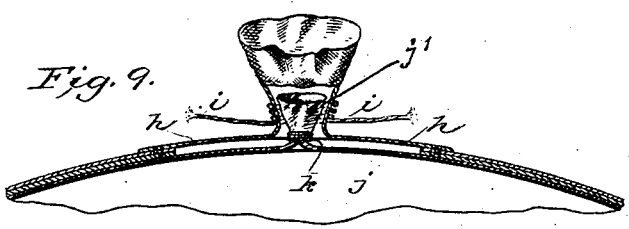
Figure 10:
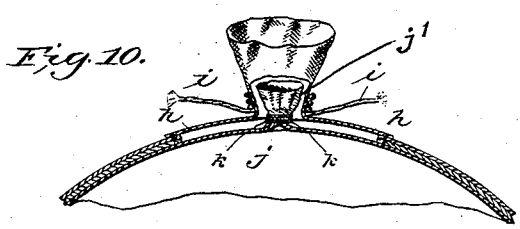
Figure 11:
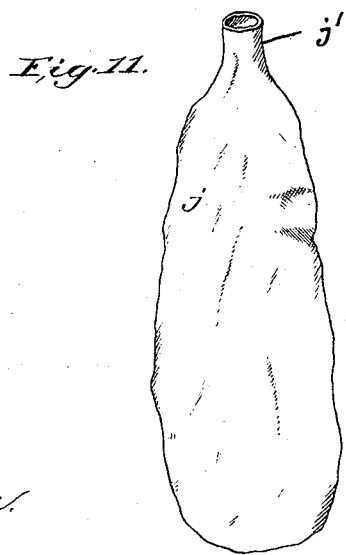

Figure 1 is an end elevation of a quarter-sphere block. Fig. 2 is a side elevation thereof. Fig. 3 is a side view of a guide plate or templet. Fig. 4 is a side view of a manipulating vise and curved strip. Fig. 5 is a side view of a manipulating stick and globe. Fig. 6 is an elevation of the flat side of a large quarter-sphere block. Fig. 7 is an end view of two such blocks. Fig. 8 is an elevation of a globe constructed according to my invention. Fig. 9 is a vertical section showing a mouth-piece for a thirty-six-inch globe. Fig. 10 is a similar view showing a mouth-piece for a twelve-inch globe. Fig. 11 is a perspective view of a rubber balloon which I employ.

I will first describe the method I adopt in the manufacture of a twelve-inch globe. I prepare a block or mold $a$ of any suitable wood to the shape of a quarter of a sphere, as represented in end view at Fig. 1 and in side view at Fig. 2, and I fix to each flat side thereof a piece of wood $b$ about six inches by four and an inch thick. I take a piece of thin muslin of suitable size, damp it thoroughly, and stretch it tightly over the curved surface of the block or mold shown at Figs. 1 and 2, tacking it down, as shown at $c$, on the flat surfaces of the block or mold $a$, near the edges thereof. The pieces $b$ of wood allow the block or mold $a$ to lie on a table or bench, so that the tacks shall be free of the surface of the said table or bench. I cut out neatly twelve globe-gores of paper, each gore being equal to thirty degrees longitude and extending from eighty-five degrees north to eighty degrees south. I damp and paste these gores and burnish them down onto the muslin which is on the block or mold $a$, beginning to place them from the equator, which is marked on the block or mold $a$, and is with each ten degrees latitude marked on a zinc or other plate $d$, as represented at Fig. 3, which I stand perpendicularly and under which I can revolve the block or mold $a$, the latter being provided with polar pins truly centered for this purpose, which polar pins rest in bearings $d^2$, formed for them in the feet or supports $d'$ of the plate $d$. This plate serves as a templet or guide to enable the gores to be pasted on the muslin on the block or mold $a$ in proper position. When the globe-gores are all pasted on the muslin on the block or mold $a$, I dry them by placing them in a hot chamber or in any other suitable manner. I then size them with animal size, thin glue, or other suitable preparation, dry again, and then apply paper varnish. The portion of the globe-cover thus prepared is removed from the block or mold $a$ and neatly trimmed round. The other three quarters of the globe are prepared in a similar manner to that above described.

To join the quarters together I take a band or strip of very smooth cotton or other suitable fabric about half an inch wide, glue or cement it, lay it on a curved strip $e$ of metal, preferably brass, rather longer than the gores, and one end of which strip is held in any convenient way, such as in the jaws $f$ of a vise, as represented at Fig. 4. I then press the inner sides of vertical edges of two quarter-globes against the cemented strip or band of cotton or other fabric, bringing the edges neatly together, and repeat this operation until all the quarters are joined together, finally removing the metal strip $e$ from the partially-completed globe by one of the polar apertures. At the south pole I now add a piece to complete it, this piece having been mounted on muslin separately on a corresponding segment of a sphere, sized, varnished, and trimmed, as before described, with respect to the main portion of the globe. The addition is made by cementing a strip of cotton or other fabric to the southern edges of the gores of the globe and fixing accurately to it the south-polar part. This strip of cotton or other fabric is slit, if required, at intervals to enable it to fit the curve to which it is applied. To assist in this operation I use a stick $g$ with a curved end piece $g'$, as represented at Fig. 5, which I introduce and withdraw from the north-polar aperture. To the north-pole end I now stitch or cement a little silk mouth-piece $h$, to which ribbons or cords $i$ are attached in any suitable manner, so that when the expansible rubber ball or balloon $j$ is introduced, inflated through its mouth-piece, and tied within the mouth-piece of the globe it can be inclosed, and thereby rendered invisible.

I will now describe the method I adopt in making a thirty-six-inch globe. Instead of employing only twelve gores and a south-polar portion, as above described with respect to the twelve-inch globe, I use for the thirty-six-inch globe seventy-two half-gores and a south-polar portion. Each half-gore extends from the equator to eighty-five degrees north or south and comprises ten degrees of longitude. Instead of employing a block or mold $a$, consisting of a quarter of a turned solid wooden sphere in the manufacture of this sized globe, I build one up of any suitable wood and form grooves $a'$ on its flat sides to receive the tacks $c$, as represented at Fig. 6, which is an elevation of the flat side of one of the blocks or molds, and as it is thus too unwieldy to handle freely for removal to a drying-chamber I cover it with thin copper, so that after mounting the muslin and the gores thereon, they can be dried without removal of the block or mold by a hand-iron with a suitably-curved surface. In this case the muslin is stretched over the block or mold $a$, as before; but instead of driving the tacks into the flat sides thereof I drive them into the grooves $a'$, so that their heads shall be below the said flat sides, and I dispense with the pieces of wood $b$. This will enable me to place one block or mold $a$ against another, as shown at Fig. 7, to see that the half-gores are accurately placed. The quarter-globes are sized, varnished, and trimmed, and also joined together in similar manner to the twelve-inch globe. The south-polar portion is also inserted in a similar way. The quarter-globes may be joined and south-polar piece added before sizing and varnishing, or before varnishing only, and the globe finished after the junctions are made.

Having fully described my invention, what I desire to claim and secure by Letters Patent is—

1. The method of manufacturing educational globes, which consists in printing on thin paper, damping and stretching thin muslin over part of an accurately-formed sphere so as to take this form, damping, pasting, and stretching the printed paper in the form of gores over and making them adhere to this muslin, drying these parts, removing and trimming them, and joining parts of sphere with smooth-surfaced strips of cotton fitting in a segment at one opening and a mouth-piece at the other opening, substantially as described.

2. An educational globe consisting of thin muslin blocked to the form of globe-segments and having globe-gores of thin paper stretched and pasted thereon, a blocked globe-segment forming the lower part of the globe, a mouth-piece at the upper part of the globe, having cords by which it is closed, and a thin expansible rubber ball or balloon having a mouth-piece and located and inflatable within the globe for taking the expanded form of the latter, substantially as described.

THOMAS RUDDIMAN JOHNSTON.

Witnesses:
B. J. B. MILLS,
CLAUDE K. MILLS.